United States Patent
Kamenetz et al.

(10) Patent No.: US 9,625,894 B2
(45) Date of Patent: Apr. 18, 2017

(54) MULTI-CHANNEL CONTROL SWITCHOVER LOGIC

(75) Inventors: Jeffry K. Kamenetz, Windsor, CT (US); Mark A. Johnston, Windsor, CT (US); Edward John Marotta, Longmeadow, MA (US); Cathleen R. Bleier, Union Hall, VA (US); John M. O'Neil, Litchfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1298 days.

(21) Appl. No.: 13/239,791

(22) Filed: Sep. 22, 2011

(65) Prior Publication Data

US 2013/0079902 A1 Mar. 28, 2013

(51) Int. Cl.
| | |
|---|---|
| G05D 3/12 | (2006.01) |
| G05D 5/00 | (2006.01) |
| G05D 9/00 | (2006.01) |
| G05D 11/00 | (2006.01) |
| G05B 19/042 | (2006.01) |
| G06F 11/20 | (2006.01) |

(52) U.S. Cl.
CPC ..... *G05B 19/0421* (2013.01); *G05B 19/0428* (2013.01); *G06F 11/2033* (2013.01); *G06F 11/2041* (2013.01); *G05B 2219/14014* (2013.01); *G05B 2219/24177* (2013.01); *G05B 2219/24183* (2013.01); *G05B 2219/24186* (2013.01)

(58) Field of Classification Search
CPC .......... H02H 3/006; H02H 3/05; G06Q 50/06; H02J 3/00

USPC .................................................. 700/82, 292
See application file for complete search history.

(56) References Cited

U.S. PATENT DOCUMENTS

| | | | |
|---|---|---|---|
| 3,978,659 A | 9/1976 | Smith et al. | |
| 4,029,952 A | 6/1977 | Giras et al. | |
| 4,358,823 A | 11/1982 | McDonald et al. | |
| 4,521,871 A * | 6/1985 | Galdun et al. | 714/11 |
| 4,562,528 A | 12/1985 | Baba | |
| 4,797,884 A | 1/1989 | Yalowitz et al. | |
| 4,807,516 A * | 2/1989 | Takats | 91/363 A |
| 4,887,214 A * | 12/1989 | Takats et al. | 701/3 |
| 4,890,284 A | 12/1989 | Murphy et al. | |
| 4,937,777 A | 6/1990 | Flood et al. | |
| 5,128,943 A | 7/1992 | Tulpule et al. | |
| 5,192,873 A | 3/1993 | Wrenbeck et al. | |
| 5,274,554 A * | 12/1993 | Takats et al. | 701/29.2 |

(Continued)

FOREIGN PATENT DOCUMENTS

WO 2006107612 10/2006

OTHER PUBLICATIONS

Extended European Search Report for Application No. 12183922.9 dated Mar. 22, 2016.

*Primary Examiner* — Ziaul Karim

(74) *Attorney, Agent, or Firm* — Carlson, Gaskey & Olds, P.C.

(57) ABSTRACT

A multi-channel control system includes a first primary control microprocessor and a second primary control microprocessor operable to control a device, and a first secondary control microprocessor and a second secondary control microprocessor operable to control the device. Each of the first and second primary control microprocessors and the first and second secondary control microprocessors are arranged as an independent control channel.

14 Claims, 4 Drawing Sheets

(56) References Cited

U.S. PATENT DOCUMENTS

| | | | |
|---|---|---|---|
| 5,279,107 A | 1/1994 | Meisner et al. | |
| 6,845,467 B1 | 1/2005 | Ditner et al. | |
| 7,328,371 B1 | 2/2008 | Kalyanasundharam et al. | |
| 7,392,426 B2 | 6/2008 | Wolfe et al. | |
| 7,424,642 B2* | 9/2008 | Howell et al. | 700/82 |
| 8,235,328 B2* | 8/2012 | Hirvonen | 244/194 |
| 8,534,599 B2* | 9/2013 | Noll | B64C 13/42 244/175 |
| 8,538,602 B2* | 9/2013 | Brot | G05D 1/0077 244/221 |
| 2010/0324756 A1 | 12/2010 | Fletcher | |

* cited by examiner

MULTI-CHANNEL CONTROL SWITCHOVER LOGIC

TECHNICAL FIELD

The present disclosure relates to electrical controllers, and more particularly to an electronic control architecture integrating multiple control channels.

BACKGROUND OF THE INVENTION

Existing electronic controls systems typically utilize multi-channel primary controllers, and a backup controller to control a device. Under normal fault-free conditions, the primary control controls the plant. The backup controller assumes control when the primary controllers experiences some threshold degree of damage or error that the primary controllers cannot recover (e.g., a channel-wide failure such as a primary control processor failure or a power supply failure).

SUMMARY OF THE INVENTION

Disclosed is a method of electronically controlling a device having the steps of: controlling a device using a first primary control microprocessor under normal conditions, controlling the device using a second primary control microprocessor when the first primary control microprocessor is unhealthy and the second primary control microprocessor is healthy, and controlling the device using a first secondary control microprocessor or a second secondary control microprocessor when the first primary control microprocessor and the second primary control microprocessor are unhealthy.

Also disclosed is an electrical control configuration having at least a first primary control microprocessor and a second primary control microprocessor operable to control a device, at least a first secondary control microprocessor and a second secondary control microprocessor operable to control the device. Each of the first and second primary control microprocessors and the first and second secondary control microprocessors are arranged as independent control channels.

These and other features of the present invention can be best understood from the following specification and drawings, the following of which is a brief description.

DETAILED DESCRIPTION OF AN EMBODIMENT

Figure 1:
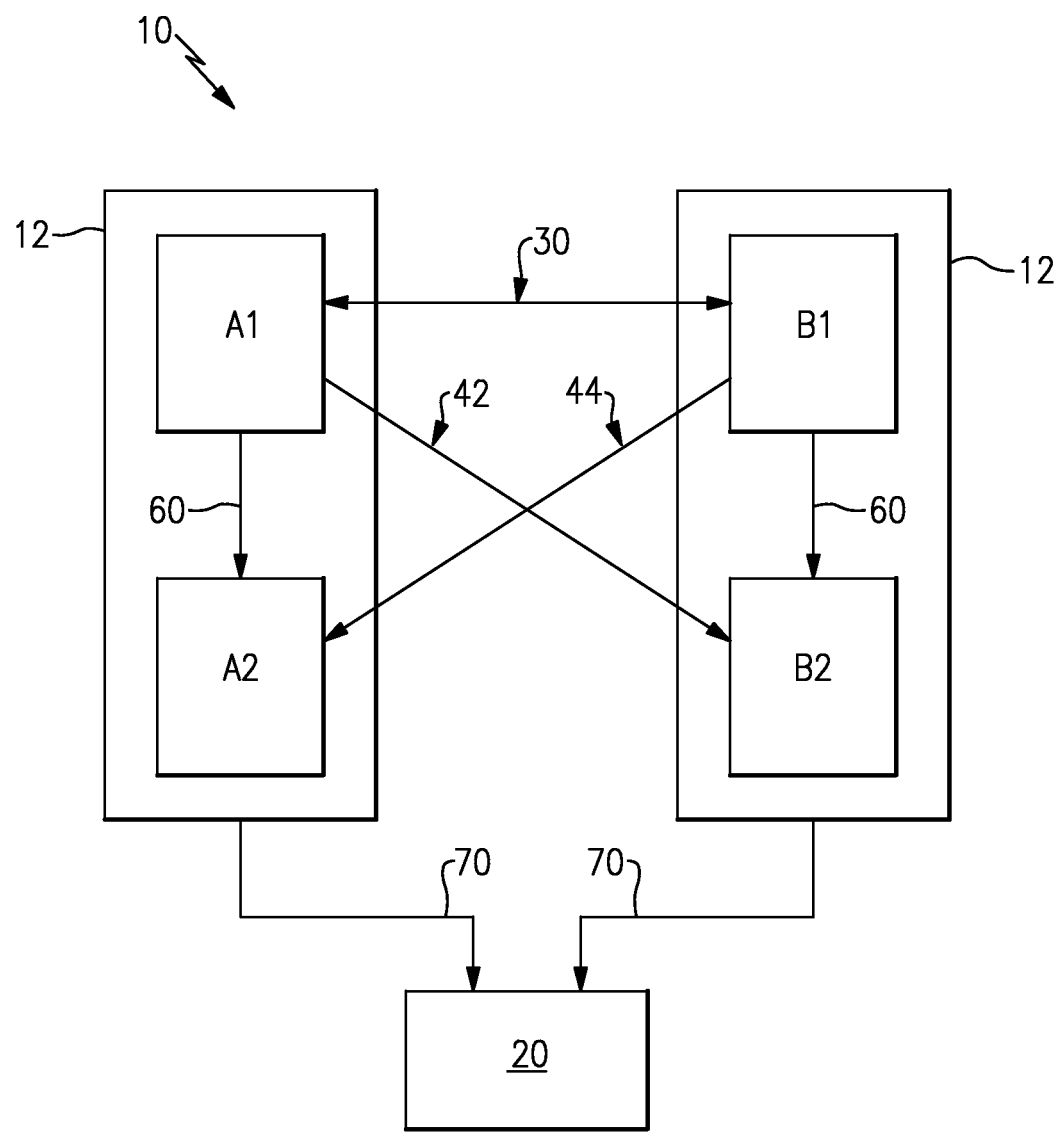
FIG. 1 illustrates an example multi-channel controller.

FIG. 1 schematically illustrates a multi-channel controller 10. The multi-channel controller 10 includes two primary control microprocessors A1, B1 and two backup control microprocessors A2, B2. Each of the primary control microprocessors A1, B1 shares a mount 12 with a corresponding local secondary control microprocessor A2, B2. Each of the mounts 12 is considered a control channel. Alternate embodiments could use four identical control microprocessors A1, B1, A2, B2 or could locate each of the four control microprocessors A1, B1, A2, B2 on separate mounts 12. Each of the primary control microprocessors A1, B1 is connected to the other primary control microprocessor A1, B1 via a cross-channel data communications link and a channel in-control signal 30. The channel in-control signal 30 informs the other primary control microprocessor A1, B1 of the operational status of the primary control microprocessor A1, B1 and the corresponding secondary control microprocessor A2, B2. The channel in-control signal 30 informs the other control microprocessors A1, B1, A2, B2 that the control microprocessor A1, B1 originating the in-control signal is currently controlling the controlled device 20. The operational status of any of the control microprocessors A1, B1, A2, B2 is referred to as the control microprocessor's health, and when the control microprocessor ceases function, the control microprocessor is referred to as being in a failure state, or unhealthy.

Each of the primary control microprocessors A1, B1 also includes a channel health signal 42, 44 (alternately referred to as a Channel Good Remote signal) connecting the primary control microprocessor A1, B1 to a remote secondary control microprocessor A2, B2, with the secondary control microprocessor B2 being remote to the primary control microprocessor A1 and the secondary control microprocessor A2 being remote to the primary control microprocessor B1. A local channel health signal 60 (alternately referred to as a Channel Good Local signal) connects each of the primary control microprocessors A1, B1 with the corresponding local secondary control microprocessor A2, B2 and performs the same function as the remote channel health signals 42, 44. Each of the two groupings of control microprocessors A1, B1, A2, B2 is connected to the controlled device 20 via a device control signal 70. It is understood that each of the signal lines 30, 42, 44, 60, 70 illustrated in FIG. 1 can represent multiple physical signals connected to the control microprocessors A1, B1, A2, B2.

Figure 2:
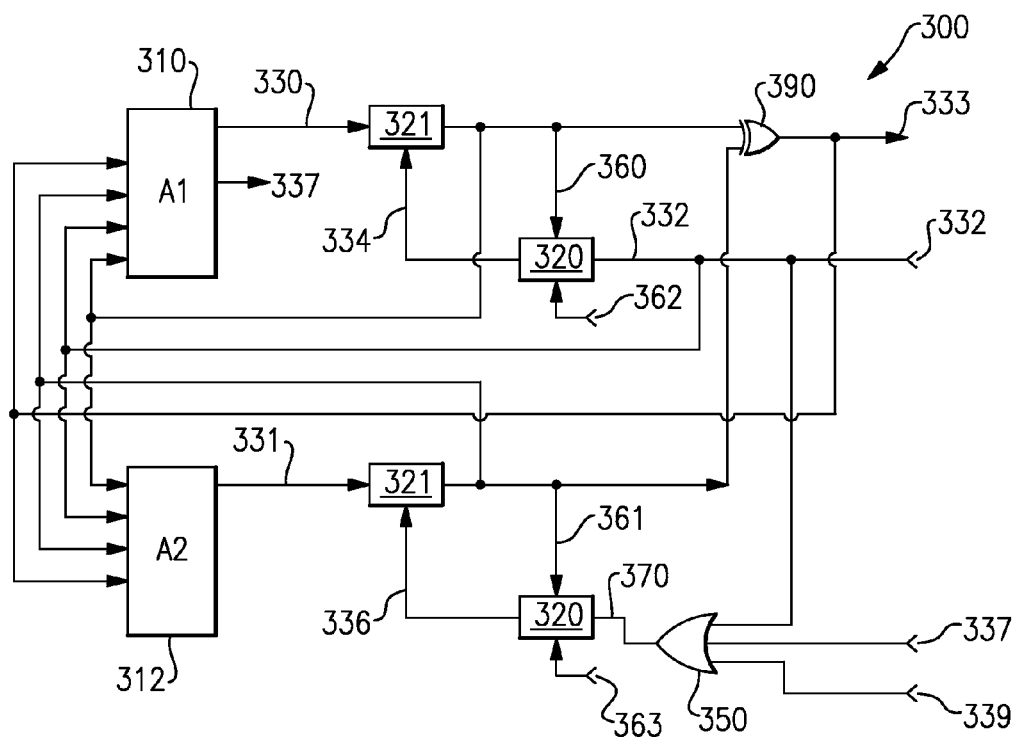
FIG. 2 illustrates a primary control microprocessor and a backup control microprocessor in a single channel of the example multi-channel controller of FIG. 1.

FIG. 2 illustrates an exemplary control channel with control microprocessors A1 and A2 and logic block 320, and the latching Boolean gate 321 in a control input configuration 300. Each of the control microprocessors has a control in-control request output 330, 331 that is passed to a standard latching Boolean gate 321 in each of the channels. Each of the latching Boolean gates 321 generates outputs referred to as control microprocessor in-control outputs. The control microprocessor in-control outputs serve as inputs to an exclusive OR gate 390. The output of the exclusive OR gate 390 provides a general channel in-control output 333 that is passed to the other channel (not illustrated). Each logic block 320 has a clear latch output 334, 336 that resets latching Boolean gate 321 output to false.

The control input configuration 300 also includes a control microprocessor in-control logic block 320 that combines a control microprocessor A1 control microprocessor in-control output 360 or a control microprocessor A2 control in-control output 361 of the current channel and a general channel in-control output 332 of the other channel (not illustrated) into a clear latch output 334, 336. The control circuit corresponding to secondary control microprocessor A2 further includes an OR gate 350 that includes inputs of a local channel health signal 337 indicating the health of the primary control microprocessor A1 in the local channel and a remote health signal 339 indicating the health of the primary control microprocessor B1 in the remote channel. The OR gate 350 then outputs a high signal indicating that the secondary control microprocessor A2 should not exert control when at least one of the two control microprocessor health inputs indicates a healthy control microprocessor or the remote channel in-control signal 332 indicates that one of the remote control microprocessors B1, B2 is in-control of the controlled device 20. The control microprocessor in-control logic block 320 then uses a logic circuit (illustrated in FIG. 3) to determine if the corresponding control microprocessor A1, A2 should exert control or should be prohibited from exerting control of the controlled device.

For redundancy, to prevent the primary control microprocessor A1, B1 and the secondary control microprocessor A2, B2 within the same control channel from attempting to be in-control simultaneously, key signals from the switchover logic are wrapped-around to both control microprocessors A1, A2. These include but are not limited to the outputs of latching Boolean gate 321 (A1 control microprocessor in-control 360 and A2 control microprocessor in-control 361), the channel in-control signal 333 and the remote channel in-control 332. In addition, these wraparound signals provide fault detection capability.

Figure 3:
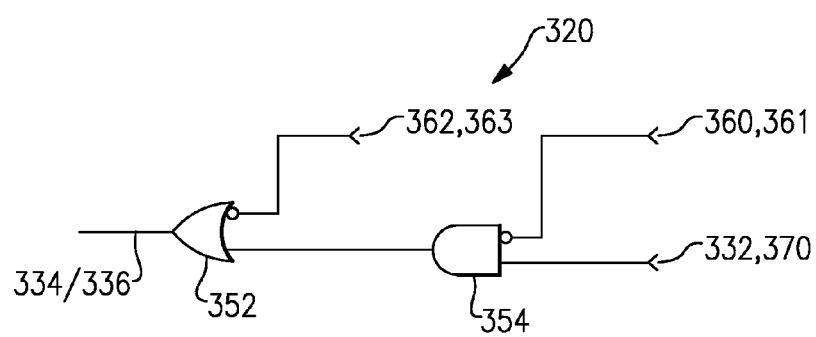
FIG. 3 illustrates a logic block for producing another channel in-control signal.

FIG. 3 illustrates the logic circuit of logic block 320 in greater detail. The logic circuit 320 includes an AND gate 354 and an OR gate 352. The AND gate 354 accepts an input 332 corresponding to either the remote channel in-control signal 332 for the logic block 320 corresponding to the primary control microprocessor A1, or an input 370 corresponding to the output of the OR gate 350 (illustrated in FIG. 2) for the backup control microprocessor A2. The AND gate 354 also accepts, and inverts, an input 360, 361 from the A1 or A2 latching Boolean gate 321, which disables the clear latch output when control microprocessor A1 or A2 is already in control. Thus, the AND gate 354 outputs a signal indicating that the corresponding control microprocessor A1, A2 is not allowed to take control of the controlled device 20 when input 370 indicates that a remote channel control microprocessor B1, B2 is in-control of the controlled device. Conversely, if a local control microprocessor A1, A2 is already in-control, the remote channel control microprocessor B1, B2 cannot take control away from the local control microprocessor A1, A2.

The output of the AND gate 354 is passed to an OR gate 352 that additionally accepts an inverted input 362,363 corresponding to a health of the control microprocessor A1 or A2. The input 362, 363 can either originate from the control microprocessor A1, A2 or from independent health logic. If the input 362, 363 indicates that the control microprocessor A1, A2 is not healthy, the enable is set false and control is taken away from the control microprocessor A1, A2. Specifically, the OR gate combines the output of the AND gate 354 and the input 362 to generate a clear latch output that is capable of deactivating the A1 control microprocessor in-control or the A2 control microprocessor in-control outputs from logic block 321.

Figure 4:
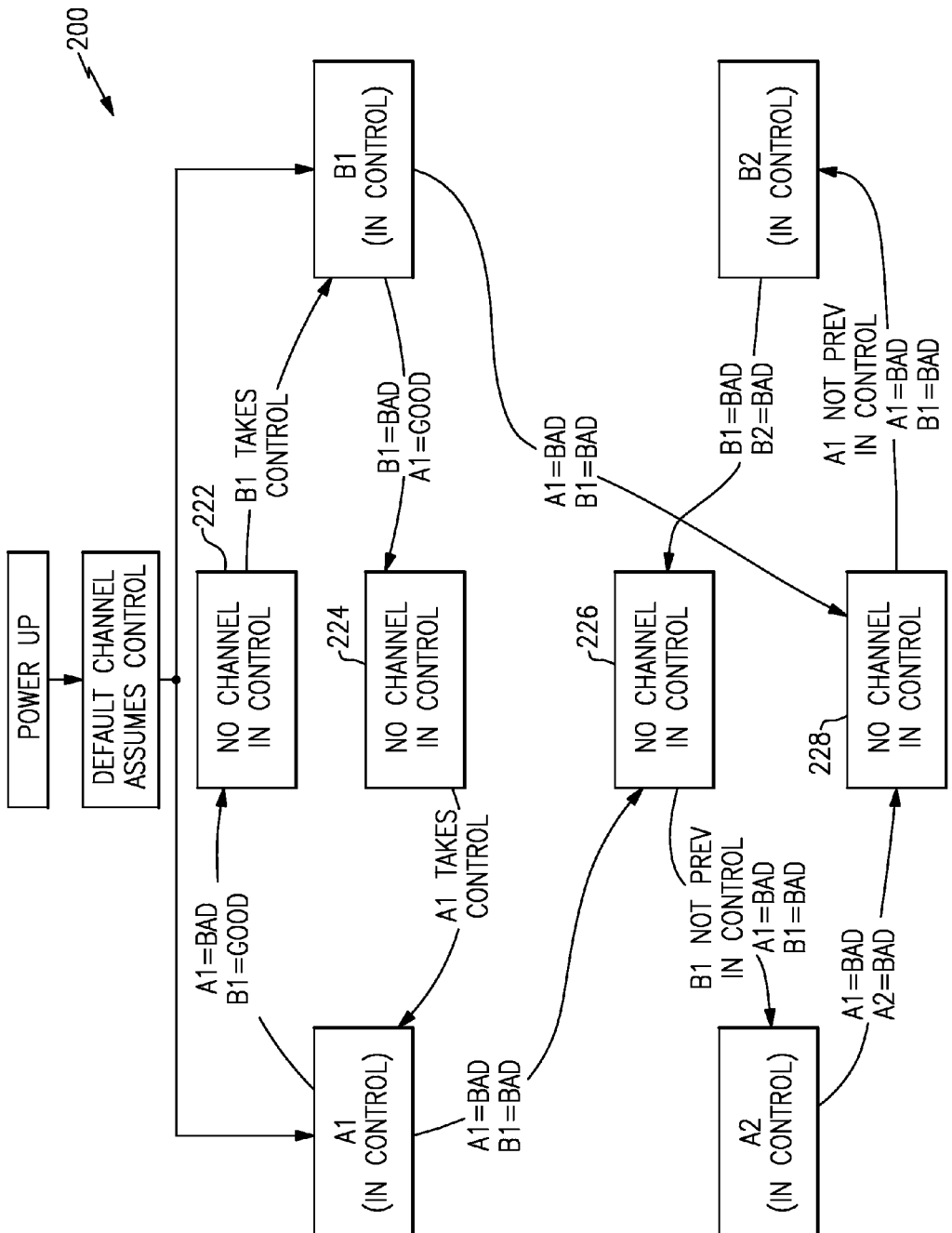
FIG. 4 illustrates a switchover state transition chart for a multi-channel controller having four channels.
Figure 5:
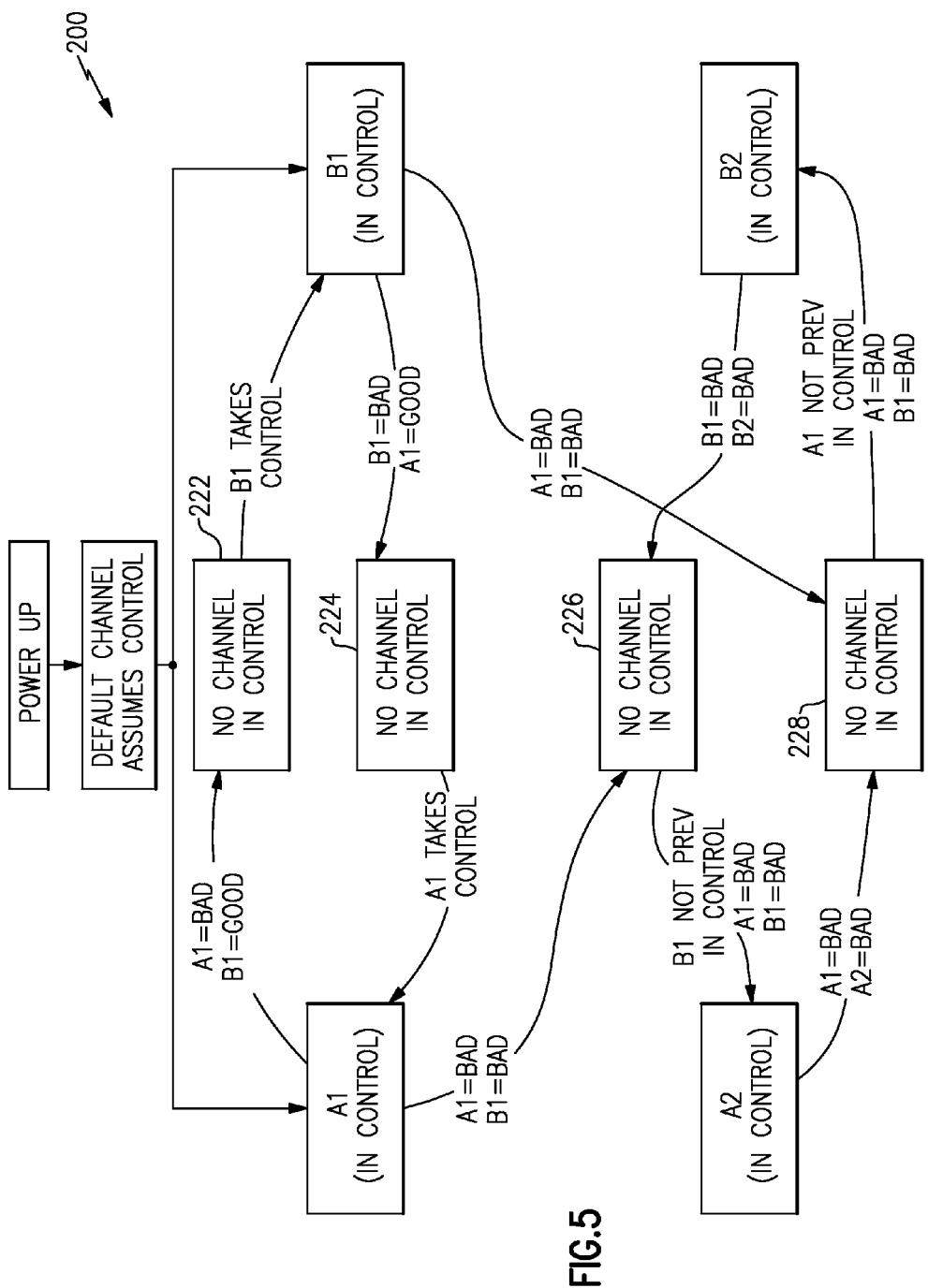

FIG. 4 illustrates a state transition chart for a two channel, four controller system 200 configured to operate as an equivalent four channel system. There are four control microprocessors A1, A2, B1, B2 that can provide controls to a controlled device and four possible no-control microprocessor in-control states 222, 224, 226, 228. Each of the four possible no-control microprocessor in-control states 222, 224, 226, 228 is entered into under varying conditions. Furthermore, each no-control microprocessor in-control state 222, 224, 226, 228 has a corresponding control microprocessor A1, A2, B1, B2 that assumes control of the system 200 when the system enters the no-control microprocessor in-control state 222, 224, 226, 228. In a system, such as the one illustrated in FIG. 4, that favors two control microprocessors A1, B1 over the other control microprocessors A2, B2. The favored control microprocessors A1, B1 are referred to as "primary control microprocessors" and the remaining control microprocessors A2, B2 are referred to as "secondary control microprocessors." Which primary control microprocessor A1, B1 starts in-control of the system 200 is determined by a default condition. The power-up default channel logic alternately places control microprocessor A1 in-control, or control microprocessor B1 in-control.

During operation of the system 200, if control microprocessor A1 is in-control, and enters a failure state, or otherwise becomes unhealthy, and control microprocessor B1 is healthy, the system 200 enters the no-channel in-control state 222, from which primary control microprocessor B1 assumes control of the controlled device. Similarly, if control microprocessor B1 is in-control of the system and enters a failure state, or otherwise becomes unhealthy, and control microprocessor A1 is healthy, the system 200 enters the no-control microprocessor in-control state 224, from which control microprocessor A1 assumes control of the controlled device.

If control microprocessor A1 is in-control of the system 200 and enters a failure state, or otherwise becomes unhealthy and control microprocessor B1 is not healthy, the system 200 enters the control microprocessor in-control state 226, from which the secondary control microprocessor A2 that is local to the primary control microprocessor A1 that was immediately previously in-control of the controlled device takes control. Likewise, if control microprocessor B1 is in-control of the system 200 and enters a failure state, and control microprocessor A1 is not healthy, the system 200 enters the no-control microprocessor in-control state 228, from which the secondary control microprocessor B2 that is local to the primary control microprocessor B1 that was immediately previously in-control of the controlled device takes control.

If the secondary control microprocessor A2 is in-control, and enters a failure state, or otherwise becomes unhealthy, and both primary control microprocessors A1, B1 are, or have been unhealthy by virtue of secondary control microprocessor A2 having been in control, the system 200 enters the no-control microprocessor in-control state 228, from which the secondary control microprocessor B2 that is remote from the previously in-control secondary control microprocessor A2 takes control of the controlled device. Likewise, if the secondary control microprocessor B2 is in-control, and enters a failure state, or become otherwise unhealthy, and both the primary control microprocessor A1, B1 are, or have been, unhealthy by virtue of secondary control microprocessor B2 having been in control, the system 200 enters the no-control microprocessor in-control state 226, from which the secondary control microprocessor A2 that is remote from the previously in-control secondary control microprocessor B2 takes control of the controlled device.

If all control microprocessors A1, A2, B1, B2 fail during operation, then the system shuts off and the controlled device enters a default state. In a typical system, the default state of the uncontrolled device is to cease operation by entering a fail-safe condition.

The above software-based state transitions can be achieved using only physical (hardware) logic gates in the logic block 320 and 321, illustrated in FIG. 2 and in the logic block 320, illustrated in FIG. 3.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method of electronically controlling a device comprising:
controlling a device using a first primary control microprocessor under normal conditions;
controlling said device using a second primary control microprocessor when said first primary control microprocessor is unhealthy and said second primary control microprocessor is healthy;
controlling said device using a first secondary control microprocessor or a second secondary control microprocessor when said first primary control microprocessor and said second primary control microprocessor are unhealthy;
each of said first primary control microprocessor, said second primary control microprocessor, said first secondary control microprocessor, and said second secondary control microprocessors that is not controlling said device accepting a channel in-control signal from one of said first primary control microprocessor, said second primary control microprocessor, said first secondary control microprocessor, and said second secondary control microprocessor wherein the microprocessor originating the channel in-control signal is controlling said device; and
wherein said channel in-control signal prohibits each of said first primary control microprocessor, said second primary control microprocessor, said first secondary control microprocessor, and said second secondary control microprocessors that is not controlling said device from asserting control.

2. The method of claim 1, wherein said channel in-control signal indicates that a channel originating the channel in-control signal is healthy and controlling said device.

3. The method of claim 1, wherein said first secondary control microprocessor takes control of said device when said first primary control microprocessor and said second primary control microprocessor are in a failure state and when said first primary control microprocessor was an immediately previous active control microprocessor.

4. The method of claim 3, wherein said second secondary control microprocessor takes control of said device when said first primary control microprocessor and said second primary control microprocessor are in the failure state, and said first secondary control microprocessor becomes unhealthy.

5. The method of claim 1, wherein said second secondary control microprocessor takes control of said device when said first primary control microprocessor and said second primary control microprocessor are in a failure state and when said second primary control microprocessor was an immediately previous active control microprocessor.

6. The method of claim 1, wherein a microprocessor is healthy when the microprocessor exhibits no faults, and the microprocessor is unhealthy when the microprocessor exhibits at least one fault.

7. An electrical control configuration comprising: at least a first primary control microprocessor and a second primary control microprocessor operable to control a device; at least a first secondary control microprocessor and a second secondary control microprocessor operable to control said device; each of said first and second primary control microprocessors and said first and second secondary control microprocessors being arranged as an independent equivalent control channel;
wherein each of said first and second primary control microprocessors and said first and second secondary control microprocessors further comprises a control input, and wherein a signal received at said control input is a positive voltage when another of said first and second primary control microprocessors and said first and second secondary control microprocessors is healthy and controlling said device; and wherein said control input is operable to prevent each of said first and second primary control microprocessors and said first and second secondary control microprocessors from asserting control over said device when said signal received at said control input is the positive voltage.

8. The electrical control configuration of claim 7, wherein each of said first and second primary control microprocessor and said first and second secondary control microprocessor comprises a corresponding switchover logic gate series, wherein each of said switchover logic gate series comprises a plurality of logic gates operable to generate control inputs for switching the corresponding control microprocessor to an active status.

9. The electrical control configuration of claim 8, wherein said switchover logic gates are operable to cause said first secondary control microprocessor to take control of said device when said first primary control microprocessor and said second primary control microprocessor are in a failure state and when said first primary control microprocessor was an immediately previous active control microprocessor.

10. The electrical control configuration of claim 8, wherein said switchover logic gates are operable to cause said second secondary control microprocessor to take control of said device when said first primary control microprocessor and said second primary control microprocessor are in a failure state, and said first secondary control microprocessor becomes unhealthy.

11. The electrical control configuration of claim 8, wherein said switchover logic gates are operable to cause control to be transitioned from said first secondary control microprocessor to said second primary control microprocessor when said second primary control microprocessor enters a healthy state, and said second primary control microprocessor was unhealthy.

12. The electrical control configuration of claim 8, wherein said switchover logic gates are operable to cause said second secondary control microprocessor to take control of said device when said first primary control microprocessor and said second primary control microprocessor are in a failure state and when said second primary control microprocessor was an immediately previous active control microprocessor.

13. The electrical control configuration of claim 8, wherein said switchover logic gates are operable to cause said first primary control microprocessor to take control of said device when said first primary control microprocessor is currently healthy and was previously in a failure state and said second primary control microprocessor is in a failure state, and said second secondary control microprocessor was control microprocessor in-control but subsequently becomes unhealthy.

14. The electrical control configuration of claim 7, wherein a microprocessor is healthy when the microprocessor exhibits no faults, and the microprocessor is unhealthy when the microprocessor exhibits at least one fault.

* * * * *